April 20, 1965  H. G. DYBVIG  3,179,329
TURBINE TYPE BLOWER WHEEL
Filed Aug. 16, 1961

INVENTOR.
Henry G. Dybvig
BY
Dybvig and Dybvig
ATTORNEYS

April 20, 1965     H. G. DYBVIG     3,179,329
TURBINE TYPE BLOWER WHEEL
Filed Aug. 16, 1961     2 Sheets-Sheet 2

INVENTOR.
Henry G. Dybvig
BY Dybvig and Dybvig
ATTORNEYS

United States Patent Office 3,179,329
Patented Apr. 20, 1965

3,179,329
TURBINE TYPE BLOWER WHEEL
Henry G. Dybvig, Dayton, Ohio, assignor to
Ruth D. Mayne, Dayton, Ohio
Filed Aug. 16, 1961, Ser. No. 131,914
3 Claims. (Cl. 230—134)

This invention relates to a turbine type blower wheel and the method of manufacturing the same, wherein the blades and the supporting structure forming the blades are made from sheet metal, although not necessarily so limited, in that other sheet materials may be used, as for example, certain types of plastic sheet material.

This invention is an improvement upon the turbine type blower wheel disclosed in the Robert A. Mayne application Serial No. 84,959, filed January 25, 1961, for Turbine Type Blower Wheel and the Method of Manufacturing the Same.

In many types of installations, the desired flow of air may not always be perpendicular to the axis of rotation of the blower wheel.

An object of this invention is to provide a blower wheel wherein the air is directed in a conical direction from the outer edges of the blower wheel, which conical direction forms an acute angle with respect to the axis of rotation of the blower wheel. This has been accomplished by forming blades from an arcuate strip of metal, the blades being integral with arcuate marginal portions. Two such strips of blades are used, one superimposed upon the other in such a manner that alternate blades come from one strip and the other blades come from the other strip. Each blade of one strip is equally spaced with respect to the adjacent blades of the other strip.

Another object of this invention is to provide a blower wheel wherein the air entering the blower is deflected so that the air leaving the blower wheel forms an obtuse angle with respect to the air entering the blower wheel.

Another object of this invention is to provide a blower wheel wherein the direction of the flow of the air entering the blower wheel and the direction of the flow of the air leaving the blower wheel are generally in opposite directions. Such a blower wheel has advantages when the air is withdrawn from the top of a building, the back-up plate of this turbine type blower wheel providing a cover for the blower wheel, tending to reduce and, in some cases, practically eliminate precipitation from entering the building through the blower wheel.

Other objects and advantages reside in the construction of parts, the combination thereof, the method of manufacture and the mode of operation, as will become more apparent from the following description.

Figure 4:
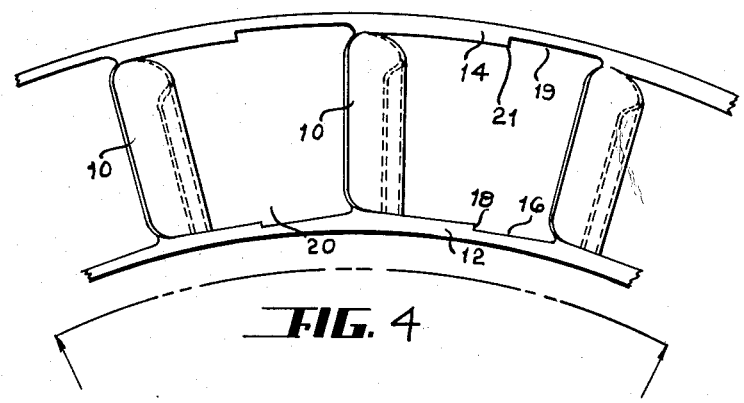
FIGURE 4 is a top plan view of a portion of one strip of metal having a pair of marginal portions and blades integral with the marginal portions and spanning the distance between the marginal portions.
Figure 5:
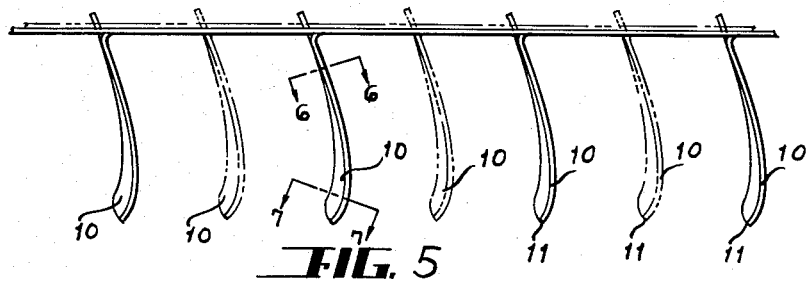

FIGURE 5 is a side elevational view of a strip showing the second strip in phantom. This figure has been taken as though the strips were straight. However, the strips are arcuate, as shown in FIGURE 4.

Figures 6, 7:
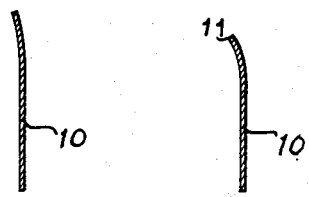

FIGURE 6 is a fragmentary, cross sectional view, taken substantially on the line 6—6 of FIGURE 5.

FIGURE 7 is a fragmentary, cross sectional view, taken substantially on the line 7—7 of FIGURE 5.

Figures 3, 8:
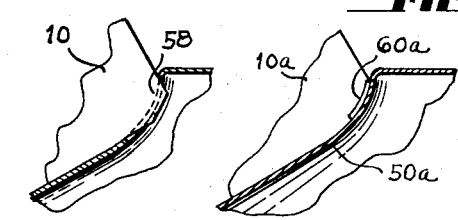
FIGURE 3 is a fragmentary, enlarged, detail view, showing the inner tip of a blade projecting through the slot in the back-up member of the blower wheel and permanently secured thereto.

FIGURE 8 discloses another modification, wherein the back-up plate has not been provided with slots; but the outer tips of the blades are secured to the outside of the back-up plate.

Figure 9:
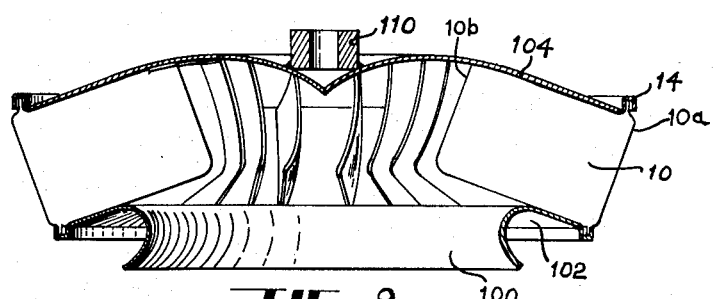

FIGURE 9 discloses another modification of a blower wheel.

Referring to the drawings, FIGURE 4 discloses a top plan view of a portion of an arcuate strip of sheet material having blades struck or cut out of and formed from the material between the blades, that is, the blades 10 are struck or formed from the sheet cut from the openings 20, each blade being formed into a concavo-convex contour from the material cut out from the arcuate strip. The reference character 10a indicates the outer margin of the blade and the reference character 10b indicates the inner margin of the blade. By using an arcuate strip, the spacing of the blades with respect to the marginal portion 12 is less than the spacing of the blades with respect to the marginal portion 14. The length of the arcuate strip is sufficient to provide half the number of blower blades required for the particular blower. These marginal portions 12 and 14 support the blades in proper spaced relation. Two of such strips with blades 10 and marginal portions 12 and 14 are used, the one being superimposed upon the other with the blades of the one being alternated with the blades of the other, so that every other blade comes from one strip and the remaining blades from the other strip. The blades are equally spaced.

In FIGURE 5 the two strips have been shown, one in full line and the other in phantom. In this particular figure, the strips have been drawn as though they were straight strips for ease in illustration. The reason for using two strips superimposed upon each other, so that the blades of one strip are alternated with the blades of the other strip, is to provide blades sufficiently close together.

Notches 19 forming shoulders 21 are used in spacing the two strips when assembling the two strips, the blades of one of the strips engaging the shoulders 18 and 21 of the other strip. The notches 16 and 19, forming shoulders 18 and 21, are used in positioning the two sheets or strips with the blades formed such that when assembled, the blades of one strip or sheet engage the shoulders 18 and 21 of the other strip. This is similar to the positioning of the two strips of material used in the manufacture of blower wheels shown in the Mayne Patent No. 2,982,468.

The radial length of each blade 10 is much greater than the width of the arcuate blank strips used in forming the blades and the adjacent marginal strips. The radial length may be approximately one and one-half times the width of the blank strips and the width of the blades may be on the order of one-half the radial length of the blades. These dimensions are used so as to produce a turbine type blower rotor. This ratio depends upon the desired output of the blower wheel.

Figure 1:
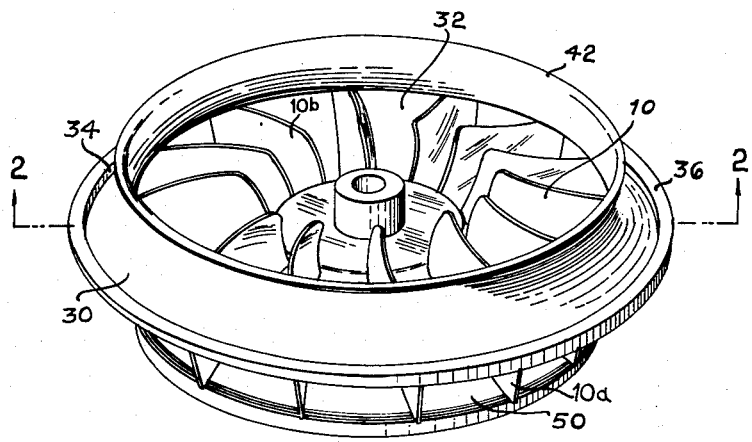
FIGURE 1 is a perspective view of the preferred embodiment of the blower wheel.
Figure 2:
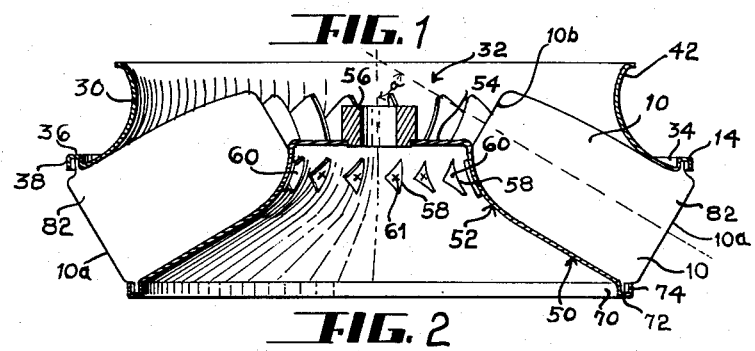
FIGURE 2 is a cross sectional view, taken substantially on the line 2—2 of FIGURE 1.

The margins 12 and 14 are spot welded at frequent intervals while in the flat, to fixedly secure the two margins 12 to each other and the two margins 14 to each other. In forming the blower wheel, the two strips are developed into a cylindrical form, as shown in FIGURES 1 and 2. The ends of the margins 12 are welded together and the ends of the margins 14 are welded together, so that the margins 12 form a cylindrical ring-like member and the margins 14 form a cylindrical ring-like member.

As may be seen from a comparison of the shape of the blades shown in FIGURES 6 and 7, the transverse curvature of the blades increases gradually from the vicinity of the section line 6—6 of FIGURE 5 towards the inner tip or corner 11 of the blade. As may be seen by referring to FIGURES 1, 2 and 5, each blade has a generally concavo-convex shape from the inner margin of the blade 10 to the outer margin thereof. This results in the outer margins of the inner portions of the blades forcing air downwardly as the blower wheel is rotated in a counterclockwise direction, as viewed in FIGURE 1. The main body of the blade 10 then propels the air conically and outwardly between the openings found between adjacent blades. The movement of the air stream as it leaves the blower wheel is along a conical path, so that if it is desired to direct the air stream outwardly part way and then in the direction of the air intake of the blower wheel, this may easily be accomplished. This results in an output air stream in a conical path. For example, if the blower wheel is placed below the fire bowl of a furnace, the air can then spread outwardly and upwardly below the fire bowl in a conical path until the air stream passes beyond the fire bowl, then it may be directed upwardly along the sides of the fire bowl.

As clearly shown in FIGURES 1 and 2, a frustum-conical member 30 with a center opening 32 is joined to the cylindrically formed margins 14. This has been accomplished by providing the outer margin of member 30 with an axially formed flange 34, a radial flange 36 and a reentrant flange 38 for snugly clamping the margins 14 to the frustum-conical intake member 30.

The inner margin of the apex of the frustum-conical member is curved at 42, so as to function as a Venturi for drawing in the air surrounding the opening 32 of the frustum-conical member 30. By providing the curved portion 42, the air is not only drawn in axially, but also diagonally beyond the outer curved portion 42 of the frustum-conical member 30. It is to be noted that the outer marginal portion of the frustum-conical member 30 forms a contact with the blades to effectively propel the air outwardly. By providing the intake opening 32 so as to function as a Venturi, a greater amount of air is drawn into the blower wheel than would be the case in the event the Venturi were eliminated.

On the side of the blades opposite the frustum-conical member 30 is placed a back-up support member or plate 50 that is also frustum-conical, abutting the adjacent edges of the blades, the apex of the back-up member merging into a radial portion 54 having fixedly attached thereto a hub 56. The center of the radial portion 54 is provided with a central aperture concentric with the opening of the hub. The back-up member 50 has a frustum-conical portion 52 provided with slots 58 through which the tips 60 of the blades 10 project. The tips 60 projecting through the slots 58 are bent into contact with the frustum-conical wall portion of the back-up plate or disc 50, so as to lock the blades in position. For higher speeds the overlapping tips 60 may be welded to the back side of the frustum-conical portion 52. This may be accomplished by spot welds 61.

The outer portion of the back-up plate 50 is provided with a radially directed annular flange 70 merging into a radial flange portion 72 and a reentrant, annular, axially directed flange portion 74, the flanges 70 and 74 rigidly clamping the margins 12 of the two strips integral with the blower blades, so as to form a rigid support. The flanges 70, 72 and 74 are similar to the flanges 34, 36 and 38 of the frustum-conical member 30. It may be necessary at spaced intervals to weld, by any suitable welding process, the flanges 34, 36 and 38 to the marginal portions 14 and to weld the flanges 70, 72 and 74 to the marginal portions 12.

In forming the blades, as shown in FIGURES 1 and 2, a small marginal portion 82 projects beyond the extreme outer margins of the frustum-conical member 30 and the back-up plate 50. For some purposes it may be desirable that the outer marginal portions 82 of the blades be flush with the outer margins of the frustum-conical member 30 and the back-up plate 50. This may be accomplished by projecting the marginal portions 12 and 14 outwardly and radially in a manner similar to that disclosed in FIGURE 9 of the above identified application Serial No. 84,959.

For very high speed operations, the margins of the blades in contact with the frustum-conical intake member 30 may be welded or soldered together. Likewise, the margins of edges in contact with the back-up plate 50 may also be welded or soldered thereto. In the event the margins of the blades are welded or soldered to the intake frustum-conical member 30 and the back-up plate 50, the slots 58 and the tips 60 may be eliminated.

In the modification disclosed in FIGURE 8, the tips 60a of the blades 10a abut the margin of member 50a and are spot welded thereto, thereby eliminating the slots 58.

Referring to the modification disclosed in FIGURE 9, the rotor, consisting of the blades 10 and the marginal portions 12 and 14, is identical to that disclosed in the preferred embodiment. However, the intake opening 100 is provided with a frustum-conical member 102 that has its margins secured to the marginal portion 12 and a back-up plate 104 has its marginal portion attached to the margins 14 of the strips containing the blades 10. In this modification, the output of the blower wheel is directed in a conical direction that forms an acute angle with the direction of flow of air into the intake opening 100 and in the opposed direction. This modification may be used above a roof for drawing air out of an opening in the roof. In the event of precipitation, the angular relation of the margins 12 and 14 is such that very little precipitation will tend to enter the building through the blower wheel. That is, the back-up support member or plate 104, so to speak, provides a cover overlying the blades 10.

The blower wheels disclosed in FIGURES 1 and 2 and the one disclosed in FIGURE 9 lend themselves to a direct drive. In other words, an armature shaft may be secured to the hub 56 or the hub 110, so that the blower wheel rotates at the same speed as the motor. The air will be drawn inwardly by the inner tip 11 of the preferred embodiment, which inner tip 11 fuctions in a manner similar to a propeller of a conventional propeller type of fan. The air is deflected into a conical pattern aided by the concave surface of the blades, that is, the concave surface extending over the cross section taken on the line 6—6 and the cross section taken on the line 7—7. Due to the rather restricted area formed between members 30 and 50 at the outer margins of the blades or formed between members 100 and 104, the air will escape at a comparatively high velocity. In other words, the blower wheel disclosed herein will deliver air at a high static pressure and at a high velocity and, at the same time, at an extremely low noise level. This assembly is easily produced, is inexpensive and, at the same time efficient.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. A turbine type blower wheel including blades formed from two arcuate strips of sheet material having marginal portions integral with the blades, said marginal portions forming cylinders between which the blades extend, the diameters of the cylinders on opposite sides being unequal, the blades from one strip alternating with the blades from the other strip, a frustum-conical member provided with a center air intake opening, said member being fixedly secured to marginal portions on one side of the blades, and a back-up member overlying the opposite side of the blades, said back-up member being fixedly secured to the oppositely disposed marginal portions.

2. A turbine type blower wheel including blades formed from two arcuate strips of sheet material having marginal portions integral with the blades, said marginal portions forming cylinders between which the blades extend, the diameters of the cylinders on opposite sides being unequal so that the blades extend inwardly at an angle, the blades of one strip alternating between blades of the other strip, the blades being equally spaced, a frustum-conical member having a centrally disposed intake opening, the outer margin of said member having an axial flange merging into a radial flange terminating in a reentrant flange, said flanges clamping the cylindrical marginal portions on one side of the blades, a back-up member having a frustum-conical portion following the contour of the edges of one side of the blades, said back-up member being provided at its outer margin with an axial flange merging into a horizontal flange terminating in a reentrant flange, said flanges clamping the back-up member to the other marginal portion integral with the blades to fixedly support the blades with respect to the back-up member.

3. A turbine type blower wheel including blades formed from two arcuate strips of material having marginal portions integral with the blades, said marginal portions forming cylinders between which the blades extend, the diameters of the cylinders on opposite sides being unequal, the blades from one strip alternating with the blades from the other strip, a frustum-conical member having a centrally positioned air intake opening located on one side of the blower wheel and a backup support member on the opposite side of the blower wheel, said backup support member being fixedly attached to the other marginal portion of the wheel.

References Cited by the Examiner

UNITED STATES PATENTS

| | | | |
|---|---|---|---|
| 1,876,518 | 9/32 | Mathis | 230—134.5 |
| 1,892,930 | 1/33 | Burman | 230—134.5 |
| 2,031,521 | 2/36 | Baumann et al. | 230—134.5 |
| 2,195,869 | 4/40 | Rathbun | 230—134.45 |
| 2,256,988 | 9/41 | Michailoff | 103—115 |
| 2,272,695 | 2/42 | Evans | 230—134.5 |
| 2,360,440 | 10/44 | Muller et al. | 230—134.45 |
| 2,431,647 | 11/47 | Mayne et al. | 230—134.5 |
| 2,714,485 | 8/55 | Goettl | 230—134.5 |
| 2,745,171 | 5/56 | King et al. | 29—156.8 |
| 2,982,468 | 5/61 | Mayne | 230—134.5 |
| 3,004,326 | 10/61 | Merz | 29—156.8 |

FOREIGN PATENTS

| | | |
|---|---|---|
| 313,206 | 7/19 | Germany. |
| 18,349 | 6/11 | Great Britain. |
| 350,763 | 6/31 | Great Britain. |
| 78,857 | 8/55 | Netherlands. |

KARL J. ALBRECHT, *Primary Examiner*.

JOSEPH H. BRANSON, Jr., HENRY F. RADUAZO,
*Examiners*.